Figure 1:
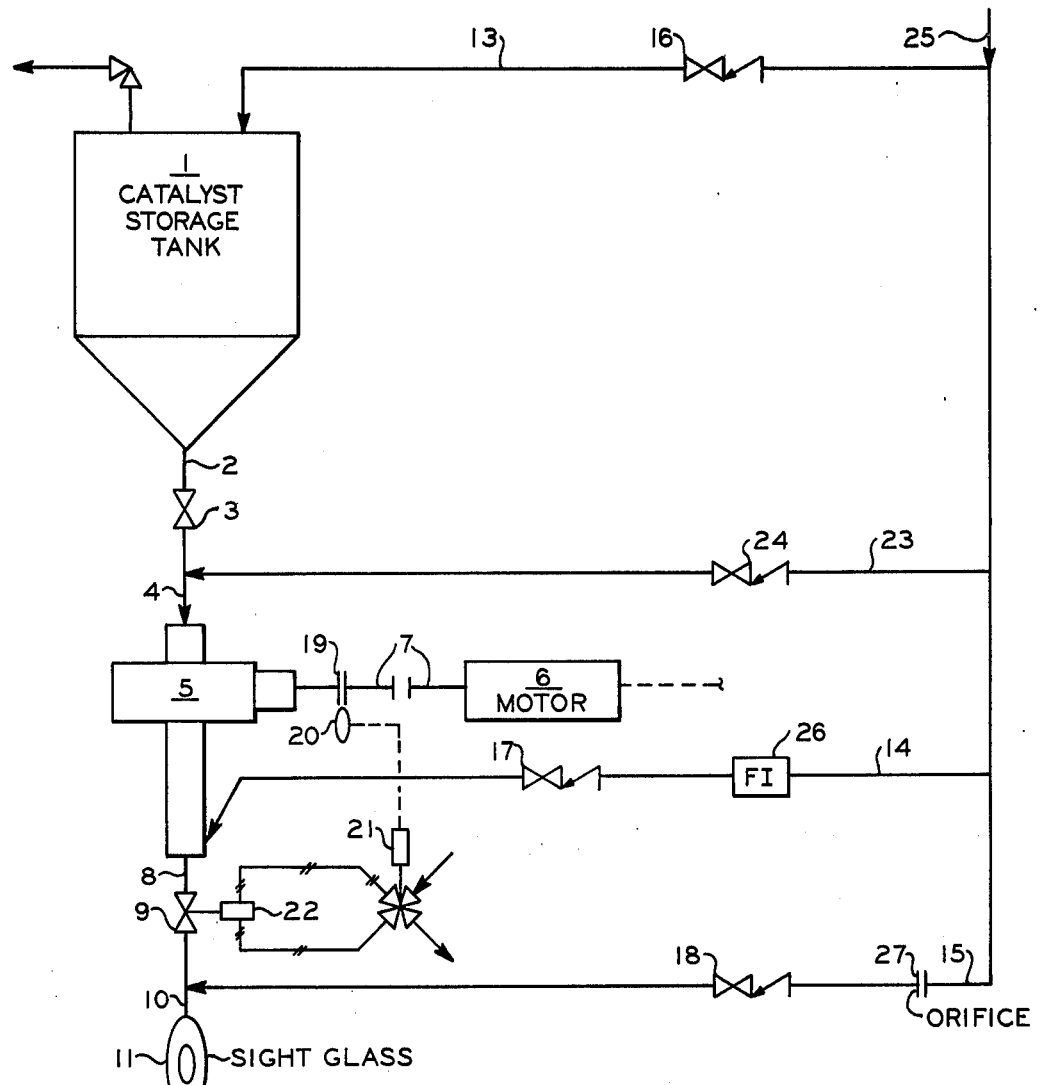

United States Patent [19]

Tribble

[11] 4,162,894

[45] Jul. 31, 1979

[54] POSITIVE SHUT-OFF FOR CATALYST FEED SYSTEM

[75] Inventor: William R. Tribble, Pasadena, Tex.

[73] Assignee: Phillips Petroleum Company, Bartlesville, Okla.

[21] Appl. No.: 652,271

[22] Filed: Jan. 26, 1976

[51] Int. Cl.² .............................................. G05D 7/00
[52] U.S. Cl. ............................. 23/230 A; 137/614.11; 422/111; 414/292
[58] Field of Search ............ 23/230 A, 253 A, 288 E, 23/288 R, 289, 290; 214/17 B; 137/614.11

[56] References Cited

U.S. PATENT DOCUMENTS

| 2,138,356 | 11/1938 | Ryan et al. | 214/17 B |
| 2,742,511 | 4/1956 | Franzen | 260/663 |
| 2,885,246 | 5/1959 | De Haven | 302/49 |
| 3,190,509 | 6/1965 | Kirchhoefer | 214/17 B |
| 3,232,494 | 2/1966 | Poarch | 214/17 B X |
| 3,347,741 | 10/1967 | Hutchison | 214/17 B X |
| 3,467,905 | 9/1969 | Thornhill et al. | 318/443 |
| 3,525,596 | 8/1970 | Grant, Jr. | 23/290 |
| 3,544,280 | 12/1970 | Thomas | 23/290 |

Primary Examiner—R. E. Serwin

[57] ABSTRACT

An apparatus and method for controlling catalyst feed to a reactor by automatically, concurrently opening and closing a double-check ball feed valve and a downstream positive shut-off valve in a catalyst feed system to a reactor.

4 Claims, 2 Drawing Figures

POSITIVE SHUT-OFF FOR CATALYST FEED SYSTEM

BACKGROUND OF THE INVENTION

This invention relates to catalytic reactions. In one of its aspects this invention relates to the introduction of catalyst into a reactor. In another of its aspects it relates to a method and apparatus for introducing measured quantities of catalyst slurry into a reactor with positive shut-off of catalyst flow between deliveries of measured quantities of catalyst. In another of its aspects this invention relates to the automatic transfer of catalyst to a reactor with delivery of measured quantities without leakage of catalyst to the reactor between regulated catalyst dosages.

In many chemical reactions, particularly in the polymerization of certain hydrocarbon monomers, a catalyst is utilized to promote the chemical reaction. It is well known that most reactions are sensitive to the quantity of catalyst utilized so that the production rate of the reaction can be controlled by controlling the rate of catalyst feed to the reaction. Accordingly, method and apparatus have been devised for accurate rate of feeding catalyst to a reaction and for provision of positive catalyst feed shut-off to the reaction.

One method for assuring accurate catalyst dosages to a reaction is the use of a double-check ball feeder valve which provides for inlet of a measured amount of catalyst into a ball valve chamber with subsequent rotation of the chamber from inlet to outlet position thereby releasing the measured amount of catalyst to the reactor system. Most reaction systems utilizing this type of valve also provide flush of carrier material for the catalyst downstream of the measuring device to assure positive transfer of the catalyst from the ball valve to the reaction system. One of the problems encountered with a double-check ball feed valve system is the leakage of the feed valve under shut-off conditions so that amounts of unwanted catalyst find a way through the feed system into the reaction system thereby increasing the reaction rate.

It is therefore an object of this invention to provide a method and apparatus for preventing a reaction in a chemical reactor from being affected by leakage of catalyst past a ball check catalyst feed valve. It is another object of this invention to provide apparatus and method for automatically delivering a controlled amount of catalyst feed to reaction system. It is still another object of this invention to provide apparatus and method for positive shut-off of catalyst flow between periods of delivering a needed amount of catalyst into a reaction system.

Other aspects, objects and the various advantages of this invention will become apparent upon study of the specifications, drawings and appended claims.

STATEMENT OF THE INVENTION

In accordance with this invention there is provided apparatus and method for controlling catalyst feed to a reactor by providing positive shut-off of catalyst flow between intermittent introduction of catalyst from catalyst storage to a reaction vessel through a ball check feed valve. The apparatus and method comprise the use of a positive shut-off valve in the catalyst transfer line downstream of the ball check feed valve with shut-off downstream of the feed valve automatically controlled so that as the ball check feed valve is rotated from the inlet to the discharge position the shut-off valve is in the open position and with closing of the shut-off valve automatically initiated, by the positioning of the feed valve for discharge.

In one embodiment of the invention a cam is attached to a shaft rotating with the ball check chamber in the feed valve so that the cam signals the rotation of the feed valve from the feed position through 180 degrees to the discharge position. The action of the cam generates a signal which actuates a solenoid valve which actuates a pneumatic operator on a shut-off valve in the feedline downstream of feed valve. The cam can simultaneously operate a limiting switch for operating the ball check feed valve and the solenoid valve controlling the opening and subsequent closing of the shut-off valve. In a more preferred embodiment the shut-off valve is operated by a pneumatic operator for which operating fluid is provided by a three-way solenoid valve that is activated by the action of a cam attached to a rotatable shaft operating with the positioning of the ball check feed valve.

In another embodiment the ball check feed valve is operated by a motor. A cam is attached to the shaft joining the motor and the ball check valve. This cam automatically operates a switch that de-energizes the motor when the feed valve reaches discharge position. A signal is generated by the operation of the drive motor which controls the operation of a solenoid valve to initiate action of an automatic valve operator controlling a shut-off valve downstream of the feed valve in the catalyst line so that the shut-off valve opens when the motor operating the ball check valve is energized and closes upon de-energizing of the motor. This embodiment requires means for control for energizing the drive motor in response to a change in a control condition in the reactor to initiate injection of a subsequent catalyst dosage. In a preferred embodiment the shut-off valve is controlled by a pneumatic operator that is activated by a three-way solenoid valve which opens when the drive motor for the ball check feed valve is energized and closes upon rotation of the feed valve drive shaft 180 degrees to operate the cam attached thereto to signal that the drive motor has been de-energized.

Operation of this invention is applicable to any catalyst feed system employing a ball-type measuring valve to deliver the amount of catalyst used for a catalyst dose to a reaction. Such valves include valves without check mechanisms in the passage chamber, valves with single check mechanisms and valves with multiple check mechanisms.

Any valve that provides position shut-off can be used in the catalyst line downstream of the feeder ball valve. Ball valves are particularly useful in this service because of ease of operation in providing positive shut-off of slurried solids material.

The shut-off valve is supplied with an automatic operator which can be motor driven, pneumatically driven, or are otherwise continuously, remotely operable by well-known apparatus upon signal to mechanism effecting the control.

Figure 2:
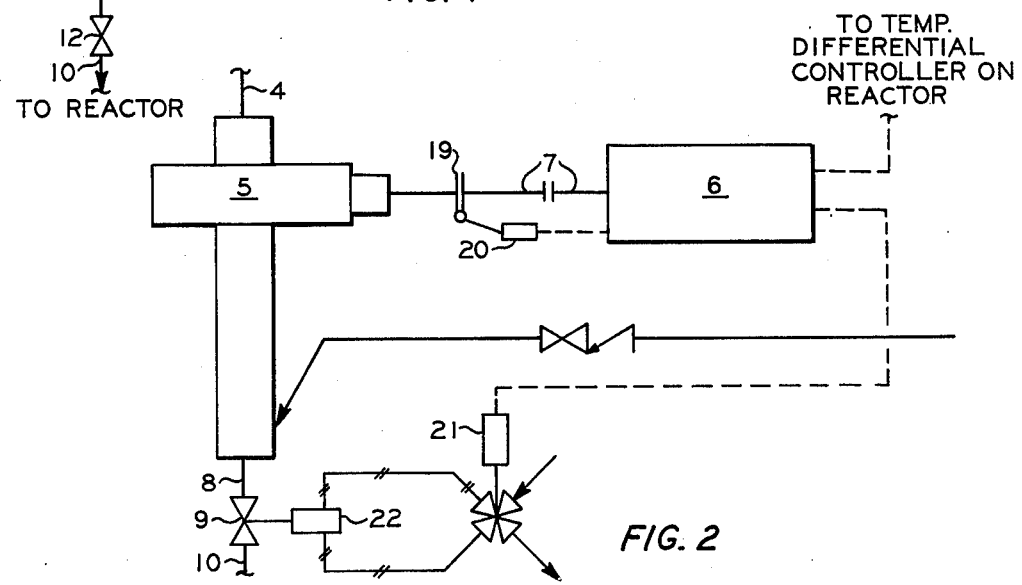

The method of this invention can be readily understood by reference to the drawing in which FIG. 1 represents a preferred embodiment of the invention illustrating direct control of a solenoid valve by cam operation of a switch and FIG. 2 represents control of a shut-off valve operated through the control for energizing a drive motor for the feed valve.

Referring now to FIG. 1, in a particularly preferred embodiment of the invention, catalyst contained in an elevated storage tank 1, maintained essentially full, is fed through transfer means 2, shut-off valve 3 and transfer means 4 into a ball valve feeder 5. The ball valve feeder is operated by motor 6 attached to rotate the feed chamber of valve 5 by shaft 7. A measured amount of catalyst is dispersed from feed valve 5 to transfer means 8 through shut-off valve 9 and transfer means 10 to a reactor. Transfer means 10 can contain a sight glass 11, and an additional shut-off valve 12 which can be hand operated. To assure proper operation of moving the catalyst through the system, carrier fluid can be supplied to the storage tank through transfer line 13 and a flush of carrier fluid can be supplied through line 14 to the downstream side of feed valve 5, to transfer line 10 through line 15 downstream of shut-off valve 9 and to transfer line 4 through line 23 between valve 3 and 5. Supplying flush requirements from a single source 25 assures a pressure equalized system to impose a favorable hydraulic head of solvent through the system. Lines 13, 14, 15 and 23 can be supplied with flow check mechanism 16, 17, 18 and 24, respectively, to prevent backflow of catalyst into the flushing system. These lines may also be equipped with a flow indicator 26 or an orifice 27 (as illustrated) to indicate or regulate flow in the lines.

In operation the feed valve 5 is rotated by motor 6 upon signal from a controller automatically monitoring an operating condition in the reactor and generating a signal to energize the motor to supply a measured amount of catalyst to the reactor. A cam 19 on the shaft 7 connecting the motor and the feed valve 5 operates upon rotation of the shaft 7 to cause switch 20 to activate a pilot air three-way solenoid valve 21 which causes the pneumatic operator 22 to open shut-off valve 9. Upon 180 degree rotation of feed valve 5 and cam 19 the switch 20 operates the pilot air three-way solenoid valve 21 to cause pneumatic operator 22 to close shut-off valve 9.

It is apparent that the flush of carrier fluid through line 14 will aid the flow of catalyst slurry from feed valve 5 through shut-off valve 9 during the period in which the shut-off valve 9 is in the open position. This flush aids in carrying particulate solids through the valve to prevent problems in positive closing of the valve upon command. When the shut-off valve 9 is closed, flush fluid provides positive pressure in the section of transfer means 8 which aids in preventing catalyst solids from leaking through feed valve 5.

Flush of carrier fluid through line 15 into the transfer means 10 downstream of shut-off valve 9 provides clearing of this line of catalyst solids permitting better flow of solids material through the transfer means upon opening of the feed valve 5 and shut-off valve 9.

In FIG. 2 all similar numbered items of the apparatus are the same as those in FIG. 1. The operation of feed valve 5 is through rotation of shaft 7 by motor 6. Cam 19 on shaft 7 operates switch 20 to de-energize motor 6 upon 180 degree rotation of shaft 7 from the inlet position of the feed valve to the discharge position for catalyst from the feed valve. The de-energizing of motor 6 operates pilot air three-way solenoid valve 21 to activate the pneumatic operator 22 to initiate closing valve 9.

The motor 6 is energized by a differential controller monitoring a reaction condition in the reactor. Upon energizing of the motor 6 the pilot air three-way solenoid valve 21 is activated to cause pneumatic operator 22 to open shut-off valve 9 and the energized motor turns shaft 7 to rotate the feed valve 180 degrees from inlet to discharge position thereby rotating the cam 19 on shaft 7 to operate switch 20 to de-energize motor 6.

For exemplifying the operation and advantages of this invention an apparatus according to the invention was set up to operate in the following manner. Catalyst was fed on demand of the reactor coolant temperature difference ($\Delta T$) controller. Since the coolant flow rate is normally constant, this procedure assured constant heat load on the reactor and therefore constant polymer product rate. When the coolant $\Delta T$ was below the set point of the instrument an electric signal from a temperature differential recorder controller (TdRC) to the motor actuator caused the motor on a Seiscore feeder to rotate 180 degrees at which point the cam on the feeder shaft actuated a limit switch, inactivating the motor but permitting the TdRC to reactivate it as necessary to maintain the $\Delta T$ control point. When current was supplied to the feeder motor it was also supplied to the solenoid on the 3-way air valve which opened a Jamesbury $\frac{1}{4}''$ ball valve, assuring a flow of flushing solvent during the cycling of the catalyst feeder. When the feeder valve was closed the solenoid was also deactivated, closing the ball valve thereby conserving the flow of flushing solvent.

EXAMPLE I

In a catalyst feed system operating with the apparatus and method of this invention, a polypropylene reactor was operated at 155° F. (68.4° C.) and 500 psia (3.45 MPa) with a propylene feed rate of 10,980 lb/hr (1.38 kg/s). Titanium complex catalyst, $TiCl_3 \cdot \frac{1}{3} AlCl_3$, was fed at 2.1 lb/hr (0.265 gm/s) using a Seiscore Model 150 double check ball valve feeder with isopentane flush below the feeder through a $\frac{1}{4}$-inch ball valve using the method of the invention. Other catalyst components separately metered into the reactor were diethylaluminum chloride at the rate of 2.6 mols/mol of titanium and triphenyl phosphite at the rate of 0.13 mols/mol of titanium. Polypropylene was produced at the rate of 3660 lb/hr (0.46 kg/s), corresponding to a productivity of 1740 kg polymer per kg titanium complex. Over a 24-hour period the reactor coolant $\Delta T$ was maintained at 9° F. (5° C.) with fluctuations of only a fraction of a degree thereby indicating uniform feed of catalyst to the reactor.

EXAMPLE II

In an operation not according to the process and apparatus of this invention the same polypropylene reactor system was operated at essentially the same conditions with the reactant and catalyst feed rates as in Example I with the exception of omitting the $\frac{1}{4}$-inch ball valve operating according to the invention. The coolant $\Delta T$ fluctuated more than $\pm 1°$ F. (0.6° C.) and occasionally as much as $\pm 2°$ F. (1.1° C.). These large fluctuations were caused primarily by intermittent leakage of catalyst past the double check ball valve feeder.

I claim:

1. In an apparatus for controlling catalyst feed to a reactor comprising a catalyst supply attached by transfer means to a ball feed valve and means for transfer into said reactor of the catalyst passed through the feed valve the improvement of:

(a) an automatically operated shut-off valve placed downstream of the feed valve in the means for transfer of catalyst into the reactor, and (b) means for automatically controlling the concurrent opening of said shut-off valve and said feed valve with closing of the shut-off valve automatically initiated by positioning of the feed valve for discharge of catalyst into the means for transferring the catalyst into the reactor.

2. In the apparatus of claim 1 said means for opening and closing said shut-off valve comprising: cam operated means attached to a shaft connected to the feed valve, said cam means operating to generate a signal as the feed valve is rotated thereby activating a control to open the shut-off valve and upon completion of rotation of the feed valve to discharge position operating to deactivate said control to initiate closing of the shut-off valve.

3. In an apparatus of claim 1 said means for opening and closing said shut-off valve comprising:

(a) cam operated means attached to a shaft connecting the feed valve with a motor for rotating said feed valve;

(b) a motor for rotating said shaft;

(c) means activated by said cam for generating a signal de-energizing said motor;

(d) means for activating a control to open said shut-off valve in response to the energizing of said motor;

(e) said means of (d) operating in response to the de-energizing of said motor to initiate the closing of said shut-off valve; and (f) means activated in response to a control condition in said reactor to energize said motor.

4. In a method for controlling catalyst feed to a reactor comprising supplying catalyst through a ball feed valve in response to a control condition in the reactor the improvement in assuring positive shut-off of the catalyst feed comprising:

(a) automatically operating a shut-off valve placed downstream of the feed valve to concurrently open said shut-off valve and said feed valve with closing of the shut-off valve initiated by positioning of the feed valve for discharge of catalyst to the reactor with positive closing of the feed valve and shut-off valve.

* * * * *